United States Patent Office 3,062,788
Patented Nov. 6, 1962

3,062,788
POLYMERS DERIVED FROM LACTONES AND CYCLIC PHOSPHITES
Richard L. McConnell and Harry W. Coover, Jr., Kingsport, Tenn., assignors to Eastman Kodak Company, Rochester, N.Y., a corporation of New Jersey
No Drawing. Filed June 29, 1959, Ser. No. 823,366
7 Claims. (Cl. 260—78.3)

This invention relates to resinous polymers derived by the reactions of lactones with organic cyclic phosphites.

The new class of polymeric compounds within the scope of the invention correspond to structures selected from those represented by the following recurring structural units:

(I) 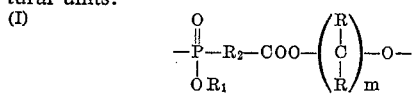

(II) 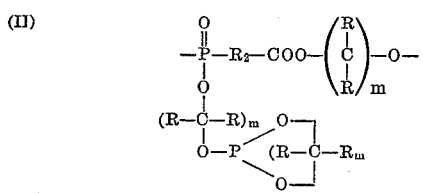

and (III) 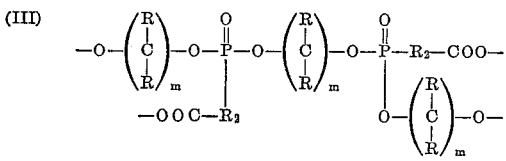

wherein $m$ represents an integer of from 2–3, R represents a hydrogen atom or an alkyl group of from 1–2 carbon atoms, e.g. methyl or ethyl, $R_1$ represents hydrogen, a straight or branched chain alkyl group of from 1–8 carbon atoms, e.g. methyl, ethyl, propyl, isopropyl, butyl, sec. butyl, 2-ethylhexyl, etc. groups, a hydroxyalkyl group of 2–3 carbon atoms, e.g. β-hydroxyethyl, γ-hydroxypropyl, etc. groups, an alicyclic group of 5–6 carbon atoms in the nucleus, e.g. cyclopentyl or cyclohexyl, a phenyl group, a chlorophenyl group, a tolyl group and a naphthyl group, and $R_2$ represents a straight or branched chain divalent alkylene group of 2–4 carbon atoms, e.g.

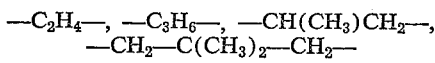

etc. groups. The above defined polymers are viscous, transparent oils or white solid polymers having molecular weights in the range of 500 to 50,000.

The polymers are soluble in one or more volatile solvents e.g. in dimethylformamide and acetone, and are especially useful as flameproofing agents for cellulose esters with which they are readily compatible. Compositions containing up to 50% by weight of the polymers represented by above structural Formula I, based on the total weight of the cellulose ester and the polymer, are especially efficacious and are preferred. While amounts as little as 5% of the polymers show appreciable flameproofing, advantageously the quantity can vary from 10–30% by weight of polymer to from 90–70% by weight of the cellulose ester. It is, accordingly, an object of the invention to provide a new class of organophosphorus compounds. Another object is to provide novel compositions of cellulose carboxylic acid esters flameproofed by incorporation therein of the above organophosphorus compounds. Another object is to provide a process for preparing the said organophosphorus compounds. Other objects will become apparent hereinafter.

In accordance with the invention, we prepare the polymeric organophosphorus compounds represented by above structure I by reacting (1) a β- or γ-lactone containing from 3–5 carbon atoms, but preferably the more reactive β-lactones, such as β-propiolactone, β-butyrolactone, β-valerolactone, 2,2-dimethyl-β-propiolactone, β-angelicalactone, γ-butyrolactone, γ-valerolactone, etc. with (2) a cyclic phosphite represented by the following general formula:

(IV) 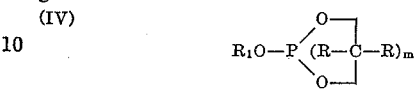

wherein $m$ and R and $R_1$ are as previously defined. The polymerization reaction may be illustrated by the following equation wherein β-propiolactone is reacted with ethylene glycol cyclic phenyl phosphite:

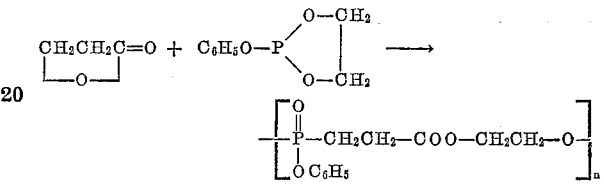

wherein $n$ represents an integer indicating that the group recurs $n$ times in linear combination. In general, the polymerization reactions as illustrated above are conducted in the absence of a solvent. However, inert solvents may be used if desired. The best results are obtained when approximately equimolar amounts of above reactants (1) and (2) are employed; however, polymers result from the reaction of the reagents in any molar ratios. Usually the reactants have to b heated to approximately 150° C. to initiate the reaction when no catalyst is used. At this point, an exothermic reaction takes place and the temperature of the reaction mixture must be controlled by external cooling. Instead of the initial heating to approximately 150° C., a catalyst may be used to initiate the reaction at 25° C. or below. Suitable catalysts include basic catalysts such as tertiary amines, e.g. trimethylamine, triethylamine, pyridine, etc., alkali metal alkoxides, e.g. sodium or potassium ethylate, or alkali metal amides, e.g. sodium or potassium amide, and the like. The operable temperature ranges from −25° C. to 300° C. While normal atmospheric pressures are preferred, it is also possible to carry out the polymerization reaction at lower or higher than atmospheric pressures. The process can also be carried out in continuous manner by continuously adding the reactants at the same rate as the polymeric product is continuously withdrawn.

Suitable cyclic phosphites coming within above Formula IV include ethylene glycol cyclic hydrogen phosphite, 1,2-propanediol cyclic hydrogen phosphite, 1,3-propanediol cyclic hydrogen phosphite, 2-methyl-2,4-pentanediol cyclic hydrogen phosphite, 2-ethyl-2-methyl-1,3-pentanediol cyclic hydrogen phosphite, 2,2-dimethyl-1,3-propanediol cyclic hydrogen phosphite, corresponding glycol cyclic phenyl (or o-, p- or m-chlorophenyl) phosphites and corresponding glycol cyclic ethyl (or methyl, propyl, isopropyl, butyl, isobutyl, 2-ethylhexyl, 2-ethyl-4-menthylpentyl, 2-hydroxyethyl, cyclopentyl or cyclohexyl) phosphites. These intermediates can be prepared in accordance with the general procedures described in Kosolapoff's "Organophosphorus Compounds," chapter 8, John Wiley & Sons, Inc., New York (1950), in U.S. Patent No. 2,833,806, dated May 6, 1958, in our copending application Serial No. 652,691, filed April 15, 1957, and in copending application of Richard L. McConnell, Serial No. 612,984, filed Oct. 1, 1956 (now U. S. Patent No. 2,916,508, dated Dec. 8, 1959).

For preparing the polymeric organophosphorus compounds of the invention represented by above structure II, the reaction conditions are generally the same as described in the preceding description, except that the initial starting organophosphorus compound that is reacted with the mentioned lactones is a glycol bis(glycol cyclic phosphite). Approximately equimolar proportions of the lactones and phosphite reactants are employed. The reaction for preparing this type of polymer may be illustrated by the following equation wherein one mole of β-propiolactone is reacted with one mole of ethylene glycol bis-(ethylene glycol cyclic phosphite):

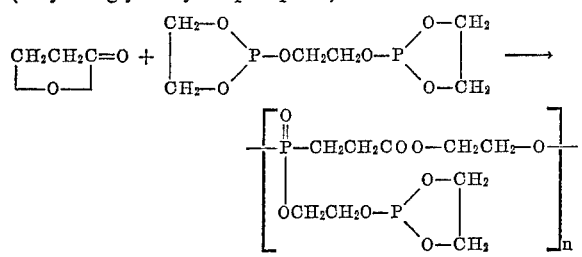

wherein $n$ is as above defined. Suitable glycol bis(glycol cyclic phosphites) for producing the polymers of structure II include those derived from 1,2-propanediol and 2,2-dimethyl-1,3-propanediol represented by the following structural formulas:

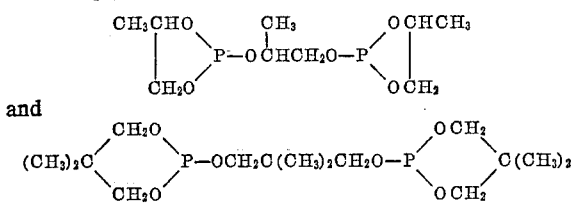

as well as from ethylene glycol, 1,3-propanediol, 2-ethyl-2-methyl-1,3-propanediol and 2-methyl-2,4-pentanediol. These intermediates may be prepared in accordance with the general procedures of U.S. Patent No. 2,841,608, dated July 1, 1958, and our copending application Serial No. 652,691, filed Oct. 1, 1956. When the above bis compounds are reacted in the proportions of from greater than one and up to 2 moles of the lactone to each mole of the bis compounds, the polymeric products obtained also contain some or is composed entirely of units corresponding to structure III.

In accordance with the preceding, the following examples are presented as illustrative of certain preferred embodiments of our invention.

Example 1

β-Propiolactone (0.2 mole) and ethylene glycol cyclic phenyl phosphite (0.2 mole) were mixed and heated to 150° C. with stirring. At this point, an exothermic reaction took place and the temperature rapidly rose to 210° C. The heating mantle was removed and the reaction flask was cooled externally with cold water to control the exothermic reaction. The temperature was maintained in the 150° to 180° C. range by intermittent cooling with cold water. After approximately 10 minutes, the exothermic nature of the reaction ceased and the temperature gradually dropped to 25° C. The product was a transparent, extremely viscous oil, $n_D^{20}$ 1.5293. It was soluble in dimethylformamide and acetone and partially soluble in benzene and ethanol. The product consisted essentially of the following linearly recurring structural unit:

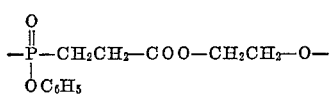

It had a molecular weight estimated at about 2500. This reaction product was stripped to a pot temperature of 161° C. at 1 micron pressure removing 2½ ml. of a colorless oil and leaving the polymer as a white solid having a melting point about 161° C.

Example 2

β-Propiolactone (0.2 mole) and ethylene glycol cyclic phenyl phosphite (0.2 mole) were mixed in a flask and stirred while triethylamine (1 ml.) was added. The temperature gradually rose to a maximum of about 50° C. The reaction mixture was stirred for 8 hours. The product was similar to that obtained in Example 1.

Similar results were obtained using sodium ethoxide, sodium methoxide, sodium isopropoxide, potassium ethoxide, potassium isopropoxide, sodium amide or potassium amide as the catalyst.

Example 3

β-Butyrolactone (0.1 mole) and 1,2-propanediol cyclic phenyl phosphite (0.1 mole) were reacted according to the procedure of Example 1 to give a viscous, transparent oil consisting essentially of the following linearly recurring structural unit:

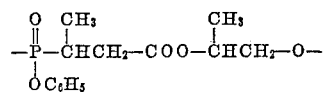

It had a molecular weight of approximately 1000.

Example 4

β-Propiolactone (0.2 mole) and ethylene glycol cyclic hydrogen phosphite (0.2 mole) were reacted according to the procedure of Example 1 to give a viscous, transparent oil consisting essentially of the following linearly recurring structural unit:

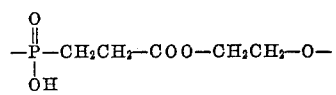

In place of the ethylene glycol cyclic hydrogen phosphite in the above example, there may be substituted an equivalent amount of other mentioned glycol cyclic hydrogen phosphites for example, 2,2-dimethyl-1,3-propanediol cyclic hydrogen phosphite to give corresponding generally similar polymeric viscous, transparent oils. The polymeric products produced according to the above example had molecular weights of approximately 3000.

Example 5

β-Propiolactone (0.3 mole) and ethylene glycol bis-(ethylene glycol cyclic phosphite, 0.3 mole) were reacted at 100° C. according to the procedure of Example 2 using tributylamine (1 ml.) as the catalyst. The polymeric viscous oils consisted essentially of the following linearly recurring structural unit:

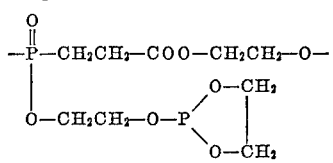

The polymer had an estimated molecular weight of approximately 5000.

Example 6

The process of Example 5 was repeated except that 0.3 mole of the β-propiolactone and 0.15 mole of the ethylene glycol bis(ethylene glycol cyclic phosphite) were employed. In this case, the resulting solid polymer had a molecular weight of about 25,000 and consisted essentially of the following structural unit:

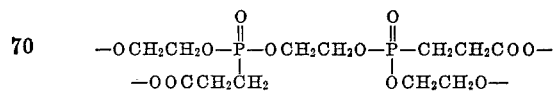

By conducting the reaction at temperatures above 100° C. and for periods longer than 8 hours, polymers with molecular weights of about 50,000 are obtained.

In place of the β-propiolactone in above Examples 5 and 6, there may be substituted equivalent amounts of any of the lactones previously mentioned as suitable to give corresponding polymers having generally similar properties and uses. Also, in place of ethylene glycol bis(ethylene glycol cyclic phosphite) in above Examples 5 and 6, there may be substituted an equivalent amount of any other of the mentioned glycol bis(glycol cyclic phosphites) to give the corresponding polymers also having generally similar properties and uses.

*Example 7*

This example illustrates the use and effectiveness of the polymers of the invention as flameproofing agents for cellulose carboxylic esters.

Two g. of cellulose acetate powder and 18 ml. of acetone were placed in a screw cap vial and agitated until a smooth, transparent dope was obtained. Then 0.5 g. of the crude reaction product of Example 1 was added and agitated until it had dissolved. This dope was poured on a glass plate and a thin film prepared with a doctor blade. When the acetone had evaporated, the transparent, well-plasticized film was removed from the plate and heated in an oven at 85° C. for 30 minutes to remove any residual acetone. The flame resistance of this film was measured by clamping a strip of film (0.5 in. x 6 in.) horizontally in a draft free burning shield. A piece of wire gauze was clamped just below the strip of film. After igniting the end of the film with a burning splint, the number of relights or the time required to consume the film are noted. Six to eight relights were required to completely consume samples of the above-described film while cellulose acetate film plasticized with a conventional plasticizer such as diethyl phthalate was completely consumed with only one ignition in 25 seconds. The other polymers described in this invention report had similar flameproofing action.

In place of the cellulose acetate in the above example, there may be substituted a like amount of other cellulose carboxylic esters, e.g. cellulose propionate, cellulose butyrate, cellulose acetate butyrate, etc. These compositions also produce films that will not support combustion.

By proceeding as set forth in the above Examples 1–6, other polymers of generally similar properties may be prepared from combinations of any of the mentioned lactones with any of the mentioned intermediate cyclic phosphites. These also are soluble, e.g. acetone, dimethylformamide, etc. and are readily compatible with the mentioned cellulose carboxylic esters to give flameproofed compositions, filaments, sheets and other shaped articles.

The invention has been described in detail with particular reference to preferred embodiments thereof, but it will be understood that variations and modifications can be effected within the spirit and scope of the invention as described hereinabove and as defined in the appended claims.

What we claim is:

1. A resinous polymer selected from the group consisting of (1) a polymer consisting essentially of the following linearly recurring structural unit:

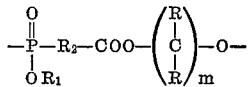

(2) a polymer consisting essentially of the following linearly recurring structural unit:

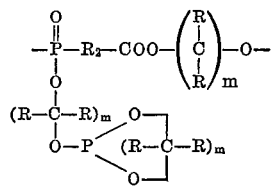

and (3) a polymer consisting essentially of the following recurring structural unit:

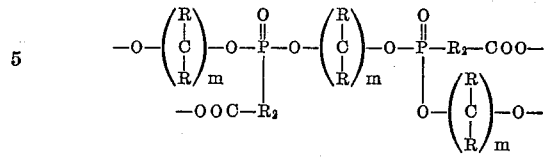

wherein $m$ represents an integer of from 2–3, R represents a member selected from the group consisting of a hydrogen atom, and an alkyl group containing 1–2 carbon atoms, $R_1$ represents a member selected from the group consisting of a hydrogen atom, an alkyl group containing from 1–8 carbon atoms, a monohydroxyalkyl group containing from 2–3 carbon atoms, a cyclopentyl group, a cyclohexyl group, a phenyl group, a monochlorophenyl group, a tolyl group and a naphthyl group, and $R_2$ represents a divalent alkylene group containing from 2–4 carbon atoms, the said resinous polymer having a molecular weight in the range of 500–50,000.

2. A resinous polymer consisting essentially of the following linearly recurring structural unit:

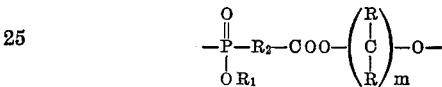

wherein $m$ represents an integer of 2–3, R represents a member selected from the group consisting of a hydrogen atom and an alkyl group containing from 1–2 carbon atoms, $R_1$ represents a member selected from the group consisting of a hydrogen atom, an alkyl group containing from 1–8 carbon atoms, a monohydroxyalkyl group containing from 2–3 carbon atoms, a cyclopentyl group, a cyclohexyl group, a phenyl group, a monochlorophenyl group, a tolyl group and a naphthyl group, and $R_2$ represents a divalent alkylene group containing from 2–4 carbon atoms, the said resinous polymer having a molecular weight in excess of 500.

3. A resinous polymer consisting essentially of the following linearly recurring structural unit:

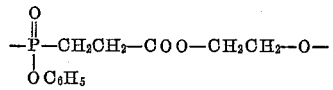

and having a molecular weight of approximately 2500.

4. A resinous polymer consisting essentially of the following linearly recurring structural unit:

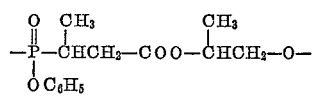

and having a molecular weight of approximately 1000.

5. A resinous polymer consisting essentially of the following linearly recurring structural unit:

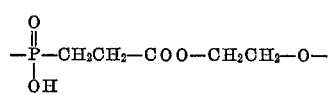

and having a molecular weight of approximately 3000.

6. A resinous polymer consisting essentially of the following linearly recurring structural unit:

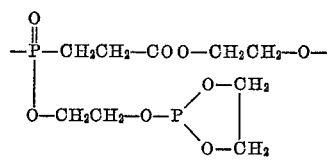

and having a molecular weight of approximately 5000.

7. A process for preparing a resinous polymer which comprises reacting (1) a lactone selected from the group consisting of a β-lactone containing from 3–5 carbon atoms and a γ-lactone containing from 3–5 carbon atoms with (2) a cyclic phosphite selected from the group consisting of a compound represented by the general formula:

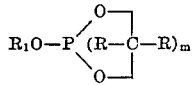

and

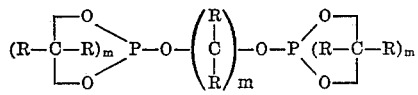

wherein $m$ represents an integer of from 2 to 3, R represents a member selected from the group consisting of a hydrogen atom and an alkyl group containing from 1 to 2 carbon atoms, and $R_1$ represents a member selected from the group consisting of a hydrogen atom, an alkyl group containing from 1 to 8 carbon atoms, a monohydroxyalkyl group containing from 2 to 3 carbon atoms, a cyclopentyl group, a cyclohexyl group, a phenyl group, a monochlorophenyl group, a tolyl group, and a naphthyl group, at from —25° C. to 300° C. in the proportions of from 1–2 moles of the said lactone to each mole of the said cyclic phosphite, said resinous polymer having a molecular weight of approximately from 500–50,000.

References Cited in the file of this patent
UNITED STATES PATENTS

| | | |
|---|---|---|
| 2,646,420 | Morgan | July 21, 1953 |
| 2,652,416 | Coover et al. | Sept. 15, 1953 |
| 2,806,050 | Scott | Sept. 10, 1957 |
| 2,893,961 | McManimie | July 7, 1959 |